US012178762B2

(12) United States Patent
Sørensen et al.

(10) Patent No.: US 12,178,762 B2
(45) Date of Patent: Dec. 31, 2024

(54) DENTAL UNIT COMPRISING A TOUCH SCREEN AND A SUPPORT (71) Applicant: XO CARE A/S, Hørsholm (DK)

(72) Inventors: Kim Sørensen, Klampenborg (DK); Michael Guldsteen Andreasen, Birkerod (DK)

(73) Assignee: XO CARE A/S, Copenhagen (DK)

( * ) Notice: Subject to any disclaimer, the term of this patent is extended or adjusted under 35 U.S.C. 154(b) by 0 days.

(21) Appl. No.: 18/568,731

(22) PCT Filed: May 24, 2022

(86) PCT No.: PCT/EP2022/064009
§ 371 (c)(1),
(2) Date: Dec. 8, 2023

(87) PCT Pub. No.: WO2022/258360
PCT Pub. Date: Dec. 15, 2022

(65) Prior Publication Data
US 2024/0269028 A1 Aug. 15, 2024

(30) Foreign Application Priority Data
Jun. 11, 2021 (EP) .................................... 21179142

(51) Int. Cl.
*A61G 15/10* (2006.01)
(52) U.S. Cl.
CPC .......... *A61G 15/10* (2013.01); *A61G 2203/16* (2013.01); *A61G 2203/20* (2013.01)
(58) Field of Classification Search
CPC ................ A61G 15/10; A61G 2203/16; A61G 2203/20; F16M 11/10; F16M 11/2021; F16M 2200/021
See application file for complete search history.

(56) References Cited

U.S. PATENT DOCUMENTS

2004/0178312 A1* 9/2004 Parsons ................... F21S 8/043
248/286.1
2009/0105551 A1 4/2009 Kelch et al.
(Continued)

FOREIGN PATENT DOCUMENTS

DE 102010021885 A1 12/2011
EP 1010404 A2 6/2000
(Continued)

OTHER PUBLICATIONS

International Search Report, dated Aug. 30, 2022, issued in PCT/EP2022/064009, 3 pages.
(Continued)

*Primary Examiner* — Insa Sadio
(74) *Attorney, Agent, or Firm* — AVEK IP, LLC (57) ABSTRACT A dental unit includes a support and a display unit with a touch screen. The display unit is connected to the support in such a manner that the display unit is rotatable between a first and a second orientation. The first orientation is suitable for enabling a dental care professional to view content displayed on the touch screen during work on a patient situated in a chair of the dental unit, and thus for displaying content on the touch screen. The second orientation is suitable for enabling a dental care professional to input information by touching the touch screen, and thus for receiving input by means of the touch screen. The support is adapted to support the display unit in the second orientation.

21 Claims, 4 Drawing Sheets

(56) References Cited

U.S. PATENT DOCUMENTS

2009/0247874 A1   10/2009  Kim
2016/0077550 A1*  3/2016  Zhang .................. G06F 3/0484
                                                          715/765
2019/0122765 A1    4/2019  Zerhusen et al.

FOREIGN PATENT DOCUMENTS

| EP | 3043244 A | 9/2019 |
| JP | 2001252313 A | 9/2001 |
| JP | 2004195092 A | 10/2008 |
| JP | 2011161113 A | 8/2011 |
| WO | 9803013 A1 | 1/1998 |
| WO | 2004006065 A2 | 1/2004 |

OTHER PUBLICATIONS

Written Opinion, dated Aug. 30, 2022, issued in PCT/EP2022/064009, 5 pages.

* cited by examiner

DENTAL UNIT COMPRISING A TOUCH SCREEN AND A SUPPORT

CROSS-REFERENCE TO RELATED APPLICATIONS

This application is the national phase of, and claims priority to, International Application No. PCT/EP2022/064009, filed May 4, 2022, which claims priority to European Patent Application No. EP 21179142.1, filed Jun. 11, 2021.

FIELD

The invention relates to a dental unit comprising a display unit with a touch screen and a support.

BACKGROUND

Dental units comprising a display unit with or without a touch screen are well known in the art. It is also well known in the art that dental units comprise features such as an instrument bridge with a plurality of dental instruments, such as dental drills, suction devices and flushing devices, a chair adapted for accommodating a patient during treatment and means separate from the dental instruments on the instrument bridge for providing water and/or suction. It is also well known in the art of dental units that the instrument bridge and the display unit may be arranged on a suitable holder such as to provide a flexible working environment for the dental care professional.

It is noted that as used herein the term "dental care professional" is intended to encompass all professional personnel working in a dental clinic, and thus not only the dentist or dental technician but also assisting personnel such as dental care assistants and dental care nurses.

Dental examinations and dental treatments are operations requiring dental care professionals to switch between on the one hand checking information on a screen and/or displaying information to the dental care professional, or possibly even to the patient, and on the other hand entering into a computer system new information and/or changes to settings, e.g. of various dental instruments.

To this end dental units generally comprise a display, which may be connected to an input device for entering information. More often, and in most recent versions of dental units, the display is provided as a touch screen. However, both viewing content and entering information on the touch screen may in some orientations of the touch screen be difficult.

Also, the positioning of the input device may force the dental care professional to make unergonomic movements and/or to take up unergonomic positions to use the touch screen, whether in order to enter information into the system or to view displayed content.

Furthermore, dental examinations and dental treatments must be performed in a sterile or highly clean environment and therefore require a high standard of hygiene. Consequently, one of many tasks faced by dental care professionals several times throughout an ordinary workday, and also by cleaning personnel working in dental clinics, is the cleaning and sterilization of the equipment present in the examination room.

As dental units are generally complex structures which comprise many different components including displays, instrument bridges and instruments and a chair, the cleaning and sterilization procedure is time consuming.

Cleaning the touch screen of the display unit may at least in some positions thereof be difficult. Also, the positioning of the display unit may further force the cleaner to make unergonomic movements and/or to take up unergonomic positions to clean the touch screen. Also, cleaning the touch screen of the display unit involves a risk of involuntarily causing inputs to the touch screen, which may in turn interfere with chosen and other settings.

EP 1 010 404 A2 discloses a dental unit with a chair, touch screens and a display. The touch screen is connected to a supply unit. The supply unit comprises a computer to which all units of the system is connected. None of the touch screens and the display are rotatable.

JP 2011 161113 A discloses a dental unit with a chair, a computer with a touch screen and a display and an instrument bridge with various dental instruments. The touch screen may be operated in either of a touch operation mode and a display mode. A changeover switch may be set to ON so that a touch operation on the touch screen is possible, or to OFF so that the touch screen does not accept a touch operation. The touchscreen is not rotatable.

US 2004/178312 A1 discloses a display which may be positioned above a dental chair. The position of the display may be adjusted about swivel and pivot axes. The display screen may comprise a touchscreen, thus allowing for input to be given to the display through the touch screen.

DE 102010021885 A1 discloses a dental chair with a touch screen which is arranged behind a glass plate. The glass plate is preprogrammed in such a way that functionalities may be activated when touching one of four preprogrammed positions. On the rear side of the touch screen, a service button is provided with which the touch screen and glass plate may be turned off completely for the purpose of cleaning the glass plate. The glass plate is resistant to liquids, particularly disinfectants.

Thus, it remains a problem to provide a dental unit with a display system with which both entering information on the touch screen and viewing content on the display unit during work on a patient is easy, and which dental unit is thus easier to operate and furthermore provides a more ergonomically correct work environment for dental care professionals.

SUMMARY

It is thus an object of the invention to provide a dental unit with which entering information on a touch screen of the display unit is easy and which is thus easier to operate and furthermore provides a more ergonomically correct work environment for dental care professionals.

According to a first aspect of the invention, the above and other objects are achieved by means of a dental unit comprising a support and a display unit with a touch screen, the display unit being connected to the support in such a manner that the display unit is rotatable between a first orientation and a second orientation, the first orientation being suitable for enabling a dental care professional to view content displayed on the touch screen during work on a patient situated in a chair of the dental unit, and is thus for displaying content on the touch screen, and the second orientation being suitable for enabling a dental care professional to input information by touching the touch screen and is thus for receiving input by means of the touch screen, and the support being adapted to support the display unit in the second orientation.

Thereby, a dental unit is provided with which both entering information on the touch screen and viewing content on the display unit during work on a patient is easy, and which dental unit is thus easier to operate and furthermore provides a more ergonomically correct work environment for dental care professionals.

Particularly, by connecting the display unit to the support in such a manner that the display unit is rotatable between a first and a second orientation as described above, a dental unit is provided with which entering information on the touch screen is easy when the display unit is in the second orientation and with which and viewing content on the display unit is easy when the display unit is in the first orientation. Such a dental unit is also easier to operate and provides a more ergonomically correct work environment for dental care professionals.

Particularly, by providing that the support is adapted to support the display unit in the second orientation, a dental unit is provided with which the display unit is stabilized in the second orientation, thus providing improved conditions for entering information on the touch screen.

In an embodiment, the second orientation is horizontal or arranged in an acute angle with respect to a horizontal plane.

Thereby, a particularly ergonomically correct work environment is provided for the dental care professional when entering information on the touch screen.

In an embodiment, the second orientation is extending in an angle α with respect to a horizontal plane, the angle α being between 0 and 40 degrees, between 0 and 15 degrees, or between 0 and 10 degrees.

For instance, the angle α may be 0 degrees, 5 degrees, 10 degrees, 12 degrees, 15 degrees, 20 degrees or 30 degrees.

Thereby, an optimized ergonomically correct work environment is provided for the dental care professional when entering information on the touch screen. Especially, it has been shown that values of the angle α between 5 and 15 degrees provide particularly good ergonomic conditions.

In an embodiment, the support comprises a first section and a second section, the first section extending in an angle β with the second section, the angle β being in the interval of 60 to 120 degrees, in the interval of 75 to 105 degrees, in the interval of 80 to 100 degrees or in the interval of 85 to 95 degrees. In a particular embodiment, the angle β is 90 degrees.

Thereby a dental unit is provided with which the above-mentioned values for the angle α is obtained in a particularly simple manner, both from a practical and a constructional point of view.

In an embodiment, the support comprises a first section adapted to support at least 5%, 10%, or 15% of the area of a rear surface of the display unit in the second orientation.

Thereby improved support of the display unit and thus the touch screen in the second orientation is provided for.

In an embodiment, the support and the display unit are connected by means of a pivot connection or a hinged connection.

Thereby a dental unit is provided with which the above-mentioned rotatability of the display unit between the first orientation and the second orientation is obtained in a particularly simple manner, both from a practical and a constructional point of view.

In an embodiment, the support is configured to act as a stop for the display unit when the display unit reaches the second orientation.

Thereby a dental unit is provided with which it is ensured that the display unit may not be moved or rotated beyond the second orientation, and thus that when the dental care professional rotates the display unit towards the second orientation, the display unit is brought into the second orientation in a particularly simple manner.

In an embodiment, the support comprises an abutment surface adapted for abutting a rear surface of the display unit in the second orientation.

Thereby, a dental unit is provided with which the stability of the display unit in the second orientation is particularly good, thus providing further improved conditions for entering information on the touch screen.

In an embodiment the abutment surface has a shape matching the shape of the rear surface of the display unit.

As an example, if the rear surface of the display unit is planar the abutment surface will be a planar surface, if the rear surface of the display unit is concave the abutment surface will be convex, and if the rear surface of the display unit is convex the abutment surface will be concave.

In an embodiment the abutment surface is a planar surface, and the rear surface of the display unit is planar.

Thereby improved support of the display unit and thus the touch screen in the second orientation is provided for. This may be especially important when the touchscreen is used for inputting text on a keyboard displayed on the touchscreen, as the impact resulting from the fingers hitting the individual keys of the displayed key board may effectively be handled.

In an embodiment the rear surface of the display unit has a width and a height, wherein the abutment surface supports the rear surface of the display along at least 30% of its height.

In an embodiment, the first orientation is vertical or arranged in an acute angle γ with respect to a vertical plane.

For instance, the angle γ may be within 30 degrees, within 20 degrees or within 10 degrees with respect to the vertical plane or within 5 degrees with respect to the vertical plane. The angle γ may for instance be 0 degrees with respect to the vertical plane, and thus perpendicular to the horizontal plane.

Thereby, a more ergonomically correct work environment, which is also improved with regard to viewing conditions, is provided for the dental care professional when viewing content on the touch screen.

In an embodiment the touch screen is configured to, when placed in the second orientation, display a keyboard. For example, the display unit may comprise a data processing device configured to, when detecting that the touch screen placed in the second orientation, present on the touch screen a keyboard, or alternatively present on the touch screen a virtual button which, when pressed by a user, triggers the display of a key board on the touch screen.

In some embodiments the touch screen may be locked. In such embodiments, the touch screen of the display unit may particularly be adapted to be locked in such a way that the touch screen when touched does not react or registers touches.

Thereby, when the touch screen is locked, it is possible to touch the touch screen without inadvertently operating it. Thus, a dental unit is thereby provided with which cleaning of the touch screen is easy and does not cause activation of the touch screen, and which furthermore provides a more ergonomically correct work environment for not only dental care professionals but also cleaning personnel while cleaning the display unit.

In an embodiment, the touch screen of the display unit is adapted to be locked when the display unit and touch screen is in at least one of the first and the second orientation.

Thereby, a dental unit with a particularly good ergonomically correct work environment for not only dental care professionals but also cleaning personnel while cleaning the display unit is provided for.

In additional or alternative embodiments, the touch screen of the display unit is adapted to be locked when the display unit and touch screen is in at least one intermediate orientation between the first and the second orientation.

Thereby, a dental unit is provided which, in addition to the abovementioned advantages, also provide the possibility of enabling both dental care professionals and cleaning personnel to rotate the display unit, e.g. between the first and second orientation, or clean the display unit in an intermediate position, without inadvertently causing unwanted activation of the touch screen.

In an embodiment, the touch screen of the display unit is adapted to be unlocked subsequently to being locked.

Thereby, a dental unit with which entry of information may be resumed after cleaning is provided for.

In an embodiment, the dental unit further comprises an external actuator adapted to allow unlocking and/or locking of the touch screen of the display unit.

Thereby, a dental unit is provided with which unlocking of the touch screen after cleaning becomes possible without contaminating the touch screen.

The external actuator may be any one of a foot pedal, a button, a lever and a remote control.

Thereby a dental unit is provided with which the advantages of unlocking of the touch screen after cleaning without contaminating the touch screen is obtained in a particularly simple manner, both from a practical and a constructional point of view.

In an embodiment, the external actuator is not physically connected to the display unit.

Thereby, a dental unit is provided with which the risk of contaminating the touch screen when unlocking the touch screen after cleaning is minimized or eliminated altogether.

In an embodiment, the external actuator is connected to the display unit by means of a wireless connection.

Thereby, a dental unit is provided with which the risk of contaminating the touch screen when unlocking of the touch screen after cleaning is minimized or eliminated altogether in a particularly simple manner, both from a practical and a constructional point of view.

BRIEF DESCRIPTION OF THE DRAWINGS

The above and/or additional objects, features and advantages of the invention will be further elucidated by the following illustrative and nonlimiting detailed description of embodiments of the invention, with reference to the appended drawings, wherein.

DETAILED DESCRIPTION

In the following description, reference is made to the accompanying figures, which show by way of illustration how the invention may be practiced.

Figure 1:
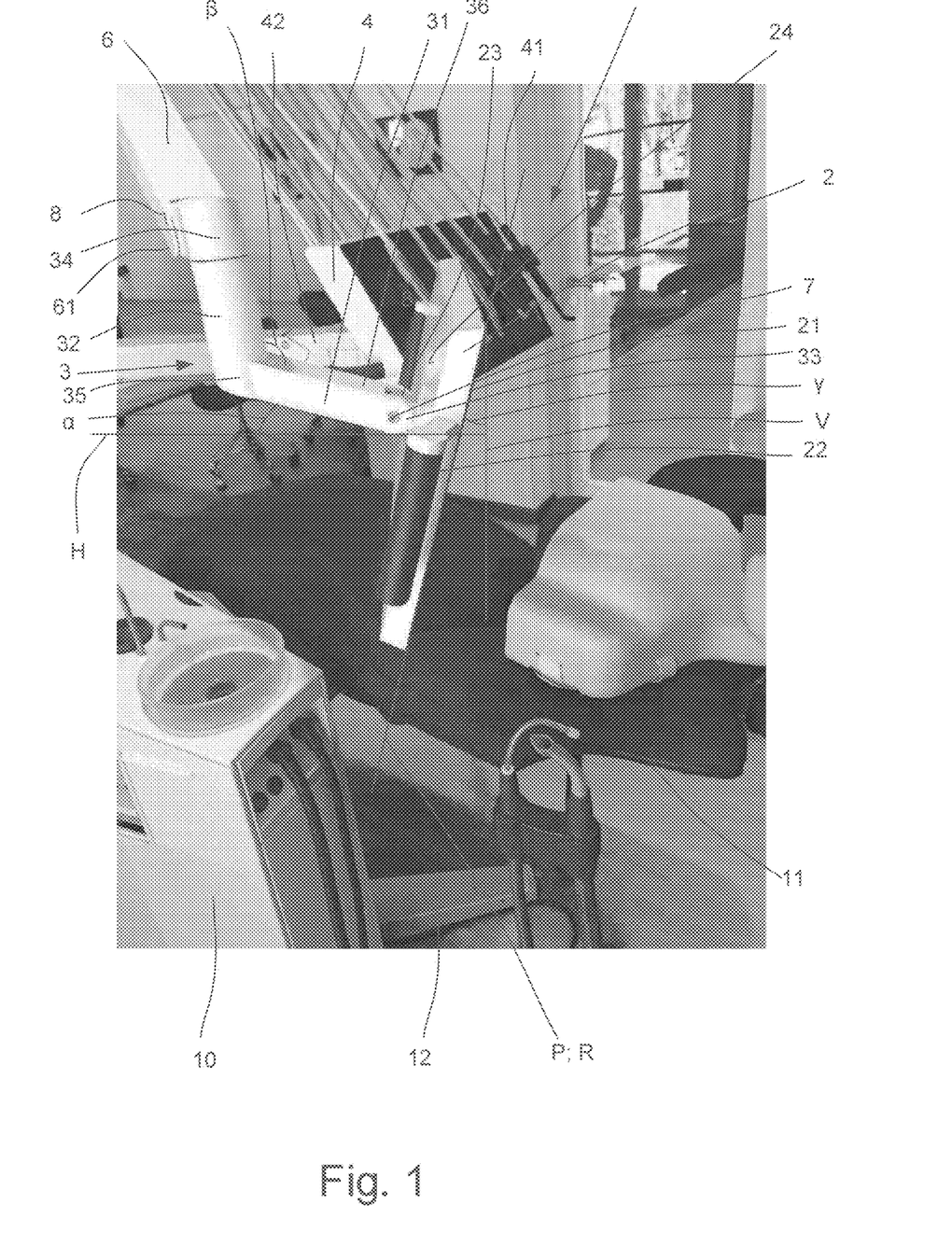
FIG. 1 shows a dental unit according to the invention with a display unit comprising a touch screen, the display unit and touch screen being shown in a first orientation.

FIG. 1 shows a dental unit 1 according to an embodiment of the invention. The dental unit 1 comprises a display unit 2 and a support 3. The display unit 2 comprises a touch screen 21. The touch screen 21 generally extends in a touch screen plane P. The touch screen 21 is provided in order to enable both displaying information or content and inputting information. The information or content to be displayed may be both directed to the dental care professional or to the patient. Information directed to the dental care professional may e.g. relate to dental instruments or to the patient. Information or content directed to the patient may e.g. be illustrations to accompany information given by the dental care professional or it may be entertainment. Information to be inputted may for instance be desired settings relating to dental instruments 41 or information to be entered into the patient's record. The display unit 2 may further comprise a handle 22 for manually moving the display unit 2 and touch screen 21.

The dental unit 1 may further comprise an instrument bridge 4 with a plurality of dental instruments 41. The instrument bridge 4 may be arranged on a holder 42. The dental unit 1 may further comprise a chair 11 adapted for accommodating a patient during treatment. Means 10 for providing water and/or suction may also be provided. The dental unit 1 may further comprise a foot pedal 12 adapted for performing certain functions in relation to the dental unit, such as e.g. operating the chair 11.

Figure 2:
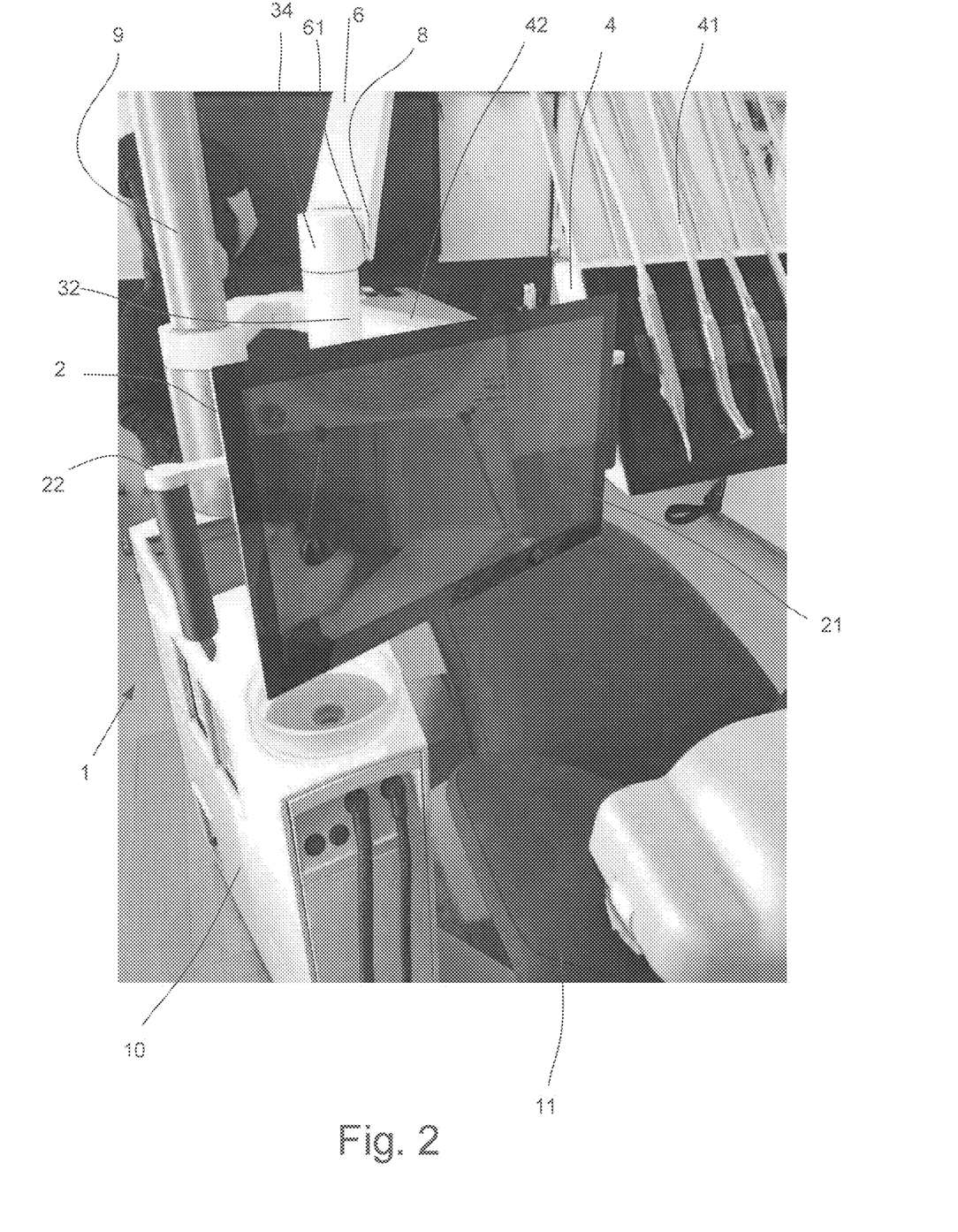
FIG. 2 shows the dental unit according to FIG. 1 from a different angle of view.
Figure 3:
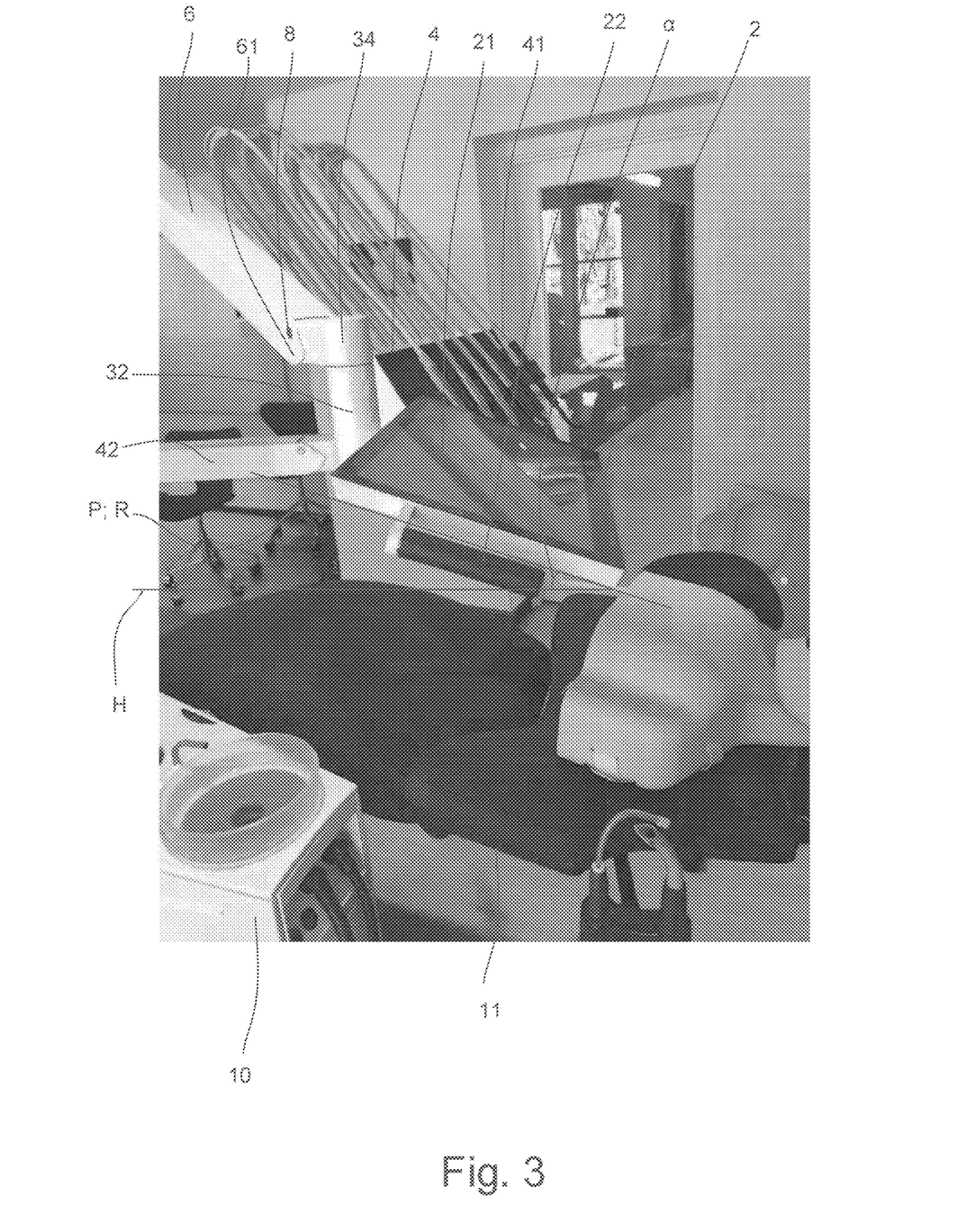
FIG. 3 shows a dental unit according to the invention with a display unit comprising a touch screen, the display unit and touch screen being shown in a second orientation.

The display unit 2, and thus the touch screen 21, is rotatable between a first orientation (FIGS. 1 and 2) and a second orientation (FIG. 3).

Referring particularly to FIG. 1, the first orientation is adapted for displaying content on the touch screen 21. In other words, the first orientation is chosen or configured such that the first orientation is suitable for enabling a dental care professional to view content displayed on the touch screen 21 while working on a patient. The first orientation is vertical or arranged in an acute angle γ with respect to the vertical plane V. The first orientation is provided to extend in an angle γ of within +/10 degrees with respect to the vertical plane V or within +/5 degrees with respect to the vertical plane V. The angle γ may for instance be 0 degrees with respect to the vertical plane V, and thus perpendicular to the horizontal plane H.

Put in other words, in the first orientation, the touch screen plane P, in which the touch screen 21 extends, is arranged vertical or arranged in the said acute angle γ with respect to the vertical plane V.

Referring particularly to FIG. 3, the second orientation is adapted for receiving input by means of the touch screen 21. In other words, the second orientation is chosen or configured such that the second orientation is suitable for enabling a dental care professional to input information by touching the touch screen 21 while providing a comfortable and ergonomically acceptable working position. The second orientation is provided to extend in an angle α of within +/10 degrees with respect to the horizontal plane H or within +/5 degrees with respect to the horizontal plane H. The angle α may for instance be 0 degrees with respect to the horizontal plane H, and thus perpendicular to the vertical plane V.

Put in other words, in the second orientation, the touch screen plane P, in which the touch screen 21 extends, is arranged horizontal or is arranged in the said angle α with respect to the horizontal plane H.

It is noted that as shown in FIGS. 1 and 3, both planes H and V extend perpendicular to the plane of the paper.

The touch screen 21 may further be configured to, when placed in the second orientation, display a keyboard. For instance, the display unit 2 may comprise a data processing device configured to detect the orientation of the display unit 2 and/or the touch screen 21 and to, when detecting that the touch screen 21 is placed in the second orientation, present on the touch screen 21 a keyboard or alternatively a virtual button which, when pressed by a user, triggers the display of a keyboard on the touch screen 21. The touch screen 21 may also be configured to, when placed in any other orientation than the second orientation, not display a keyboard.

The support 3 is adapted to support the display unit 2 and thus the touch screen 21 in the second orientation—see FIG. 3. As is best seen on FIG. 1 the support 3 comprises a first section 31 and a second section 32. The first section 31 is connected, or is adapted to be connected, to the display unit 2. The first section 31 is furthermore adapted to support a part, particularly at least 5%, of the area of a rear surface 24 of the display unit 2 in the second orientation. The second section 32 is connected, or is adapted to be connected, to a holding device 9 (cf. FIG. 2) or an arm 6 connected to a holding device 9.

The first section 31 is arranged such as to extend, in an assembled condition of the dental unit 1, in an angle α with respect to the horizontal. The angle α may be within +/20 degrees with respect to the horizontal, or within +/5 degrees with respect to the horizontal.

The first section 31 may further comprise an abutment surface 36. The abutment surface 36 is adapted for abutting a rear surface 24 of the display unit 2 in the second orientation of the display unit, thereby providing improved support of the display unit 2. The abutment surface 36 may be adapted to support at least 5% of the area of the rear surface 24 of the display unit 2 in the second orientation. The abutment surface 36 may be shaped such as to conform to the shape of the rear surface 24 of the display unit 2 such as to provide for an improved support of the display unit 2 in the second orientation. For instance, the abutment surface 36 may be a plane surface, and the rear surface 24 of the display unit 2, or at least a part of the rear surface 24, may be a corresponding plane surface.

As shown on FIG. 1, the display unit 2 and the support 3 are connected pivotally to one another. To this end the connection between the display unit 2 and the support 3 is provided as a hinged or pivotal connection. In the embodiment shown in the figures, the display unit comprises a connecting section 23 and the support 3 comprises a corresponding connecting section 33. The first section 31 of the support 3 comprises the connecting section 33. The connecting sections 23 and 33 are connected to one another by means of a pivot axis 7 such that the display unit 2 may pivot around the pivot axis 7.

The first section 31 and the second section 32 are connected in a bend 35 and extend in an angle β with one another. The angle β lies in the interval of 60 to 120 degrees, the interval of 80 to 100 degrees or in the interval of 85 to 95 degrees. The angle β may for instance be 90 degrees. The first section 31 and the second section 32 may be made in one piece, e.g. by casting or moulding, or may be welded together.

The second section 32 is connected to an arm 6 by means of a connection. The connection between the second section 32 of the support 3 and the arm 6 may be provided as a hinged or pivotal connection such as to enable a further degree of freedom in adjustment of the orientation of the display 2 and touch screen 21. In the embodiment shown in the figures, the support 3 comprises a connecting section 34 provided on the second section 32, and the arm 6 comprises a corresponding connecting section 61. The connecting sections 34 and 61 are connected to one another by means of a pivot axis 8 such that the support 3 and thereby the display unit 2 may pivot around the pivot axis 8.

In some embodiments, the connecting section 34 and the second section 32 may also be connected pivotally to one another. Thereby, a still further degree of freedom in adjustment of the orientation of the display 2 and touch screen 21. In such embodiments the second section 32 is rotatable with respect to the connecting section 34 around an axis extending in the longitudinal direction of the second section 32 and/or the connecting section 34.

In yet other embodiments, the arm 6 may be omitted and the second section 32 of the support 3 may be connected directly and pivotally to the holding means 9. In such embodiments, the connecting section 61 may be provided on the holding means 9.

FIGS. 1 and 2 show the display unit 2, and thus the touch screen 21, arranged in the first orientation. As may be seen, the display unit 2, and thus the touch screen 21, and the first section 31 of the support 3 are in the first orientation arranged perpendicular or substantially perpendicular to one another. Thereby, the display unit 2, and thus the touch screen 21, is arranged in a vertical orientation, or in an angle with respect to the vertical corresponding in size to the angle γ described above. Thereby, the first orientation is adapted for displaying content on the touch screen 21.

FIG. 3 shows the display unit 2, and thus the touch screen 21, arranged in the second orientation. As may be seen, the display unit 2, and thus the touch screen 21, is in the second orientation arranged resting on or in abutment with the first section 31 of the support 3. Thereby, the display unit 2, and thus the touch screen 21, is arranged in a horizontal orientation, or in an angle with respect to the horizontal H corresponding in size to the angle α described above. Thereby, the support 3 ensures a stable positioning of the display unit 2, and thus the touch screen 21. Thereby, the second orientation is adapted for inputting information on the touch screen 21.

Figure 4:
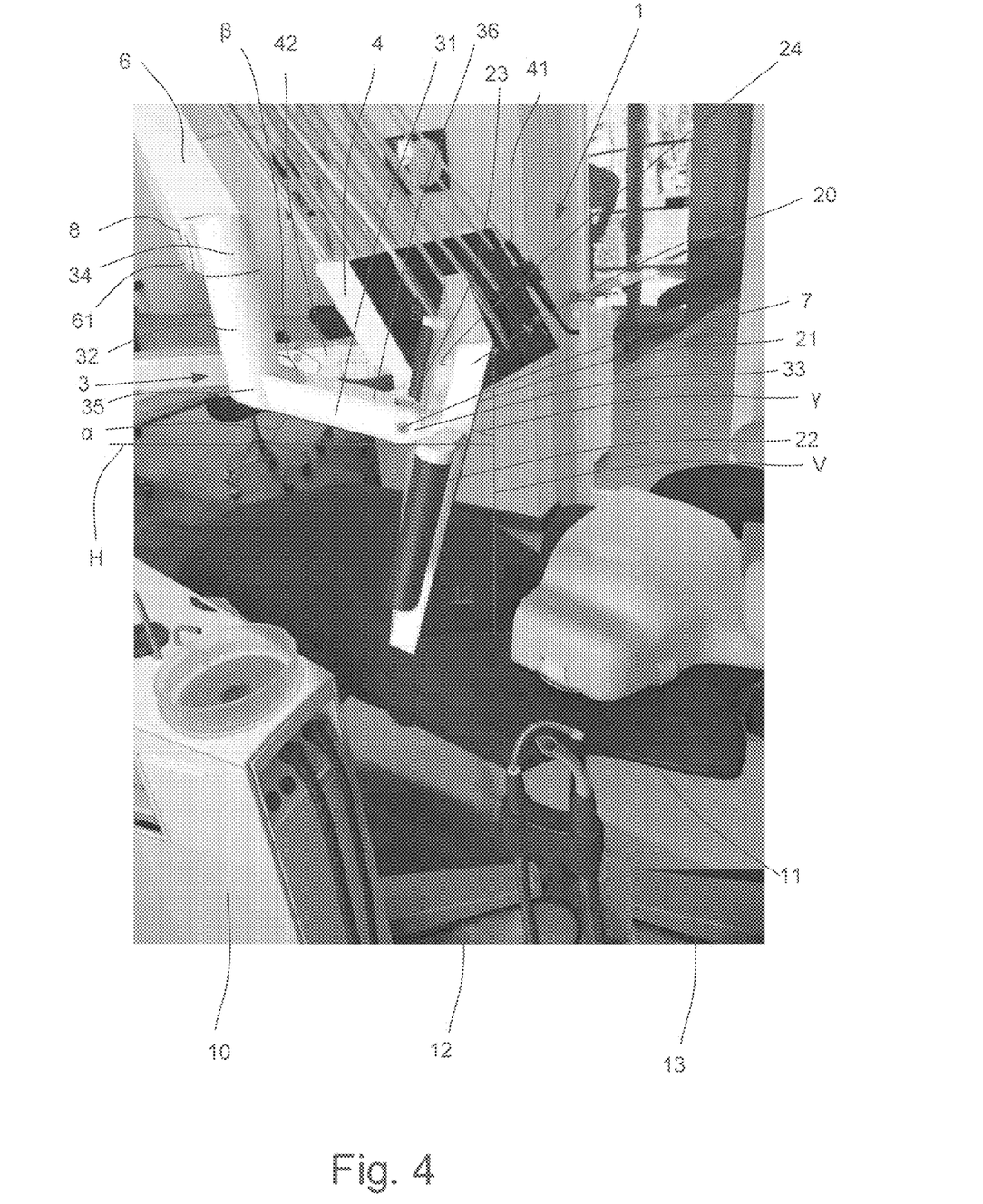
FIG. 4 shows a dental unit according to another embodiment of the invention with a display unit comprising a touch screen, the display unit and touch screen being adapted to be locked, and the dental unit further comprising an external actuator.

Turning now to FIG. 4, a dental unit 20 according to another embodiment of the invention is shown. The dental unit 20 shown in FIG. 4 differs from that described above with reference to FIGS. 1-3 in that the touch screen 21 of the display unit 20 is adapted to be locked in such a way that the touch screen does not react when touched or registers touches. The touch screen 21 may be adapted to be locked when the display unit 20 and touch screen 21 is in one or more of the first orientation, the second orientation and at least one intermediate orientation between the first and the second orientation. The touch screen 21 of the display unit 20 is adapted to be unlocked subsequently to being locked.

The dental unit 20 may further comprise an external actuator 13 to allow unlocking and/or locking of the touch screen 21 of the display unit 2. The external actuator 13 is not connected physically, but rather by means of a wireless connection, to the display unit 2. The external actuator 13 may be a foot pedal as shown in FIG. 4. Alternatively, the external actuator 13 may be a button or a lever or a remote control.

At least locking of the touch screen 21 of the display unit 2 may also be achieved by operating an actuator provided digitally on the touch screen 21 or being physically connected to the touch screen 21 or the display unit 2.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A dental unit, comprising:
   a support; and
   a display unit with a touch screen, the display unit being connected to the support in such a manner that the display unit is rotatable between a first orientation and a second orientation;
   wherein:
   the first orientation is suitable for enabling a dental care professional to view content displayed on the touch screen during work on a patient situated in a chair of the dental unit, and thus is for displaying content on the touch screen;
   the second orientation is suitable for enabling a dental care professional to input information by touching the touch screen, and thus is for receiving input by means of the touch screen;
   the support is adapted to support the display unit in the second orientation; and
   the second orientation is horizontal or arranged in an acute angle with respect to a horizontal plane.

2. The dental unit according to claim 1, wherein the second orientation is extending in an angle α with respect to a horizontal plane, the angle α being between 0 and 40 degrees.

3. The dental unit according to claim 1, wherein:
   the support comprises a first section and a second section, the first section extending in an angle β with the second section, the angle β being in the interval of 60 to 120 degrees; and/or
   the support comprises a first section, the first section being configured to support at least 5% of the area of a rear surface of the display unit in the second orientation.

4. The dental unit according to claim 1, wherein the support and the display unit are connected by means of a pivot connection or a hinged connection.

5. The dental unit according to claim 1, wherein the support is configured to act as a stop for the display unit when the display unit reaches the second orientation.

6. The dental unit according to claim 1, wherein:
   the support comprises an abutment surface, the abutment surface being:
   adapted for abutting a rear surface of the display unit in the second orientation; and/or
   a plane surface.

7. The dental unit according to claim 1, wherein the support comprises an abutment surface, the abutment surface being adapted to support at least 30% of the area of a rear surface of the display unit in the second orientation.

8. The dental unit according to claim 1, wherein the first orientation is vertical or arranged in an acute angle with respect to a vertical plane.

9. The dental unit according to claim 1, wherein;
   the touch screen is configured to, when placed in the second orientation, display a keyboard; and/or
   the display unit comprises a data processing device configured to, when detecting that the touch screen placed in the second orientation, present on the touch screen a keyboard; and/or
   the display unit comprises a data processing device configured to, when detecting that the touch screen placed in the second orientation, present on the touch screen a virtual button which, when pressed by a user, triggers the display of a keyboard on the touch screen.

10. The dental unit according to claim 1, wherein the touch screen of the display unit is adapted to be locked in such a way that the touch screen, when touched, does not react or registers touches.

11. The dental unit according to claim 10, wherein the touch screen of the display unit is adapted to be locked when the display unit and touch screen is in at least one of the first and the second orientation.

12. The dental unit according to claim 10, wherein the touch screen of the display unit is adapted to be unlocked subsequently to being locked.

13. The dental unit according to claim 10, further comprising an external actuator to allow unlocking and/or locking of the touch screen of the display unit.

14. The dental unit according to claim 13, wherein the external actuator is any one of a foot pedal, a button, a lever and a remote control.

15. The dental unit according to claim 13, wherein:
   the external actuator is not physically connected to the display unit; and/or
   the external actuator is connected to the display unit by means of a wireless connection.

16. The dental unit according to claim 2, wherein the support and the display unit are connected by means of a pivot connection or a hinged connection.

17. The dental unit according to claim 2, wherein the support is configured to act as a stop for the display unit when the display unit reaches the second orientation.

18. The dental unit according to claim 2, wherein:
   the support comprises an abutment surface, the abutment surface being:
   adapted for abutting a rear surface of the display unit in the second orientation; and/or
   a plane surface.

19. The dental unit according to claim 2, wherein the support comprises an abutment surface, the abutment surface being adapted to support at least 30% of the area of a rear surface of the display unit in the second orientation.

20. The dental unit according to claim 2, wherein the first orientation is vertical or arranged in an acute angle with respect to a vertical plane.

21. The dental unit according to claim 1, wherein:
   the touch screen is configured to, when placed in the second orientation, display a keyboard; and/or
   the display unit comprises a data processing device configured to, when detecting that the touch screen placed in the second orientation, present on the touch screen a keyboard; and/or the display unit comprises a data processing device configured to, when detecting that the touch screen placed in the second orientation, present on the touch screen a virtual button which, when pressed by a user, triggers the display of a keyboard on the touch screen.

\* \* \* \* \*